United States Patent [19]

Breckner

[11] Patent Number: 4,770,610

[45] Date of Patent: Sep. 13, 1988

[54] FRAIL MATERIAL SLURRY PUMP

[75] Inventor: Raymond A. Breckner, Richmond, Canada

[73] Assignee: Innovac Technology Inc., Richmond, Canada

[21] Appl. No.: 82,508

[22] Filed: Aug. 7, 1987

[51] Int. Cl.$^4$ ............................................. F04F 1/06
[52] U.S. Cl. .................................. 417/12; 417/37; 417/135; 417/136; 417/140; 417/478; 119/3
[58] Field of Search .............. 119/3; 251/5; 417/138, 417/140, 145, 37, 12, 478, 479, 510, 132, 135, 136

[56] References Cited

U.S. PATENT DOCUMENTS

| | | | |
|---|---|---|---|
| 2,596,593 | 5/1952 | Paxton | 417/140 |
| 2,943,578 | 7/1960 | McCombie | 417/140 |
| 3,007,416 | 11/1961 | Childs | 417/394 X |
| 3,573,934 | 4/1971 | Mitchell | 119/3 |
| 3,583,365 | 6/1971 | Harden | 119/3 |
| 3,701,618 | 10/1972 | Wall et al. | 417/478 X |
| 3,871,332 | 3/1975 | Hayashi | 119/3 |
| 4,135,550 | 1/1979 | Andersson | 137/565 |
| 4,181,470 | 1/1980 | Gillett | 417/140 X |
| 4,222,496 | 9/1980 | Start et al. | 417/37 X |
| 4,268,005 | 5/1981 | Raftis et al. | 251/5 |
| 4,316,702 | 2/1982 | Kiowski et al. | 417/12 |
| 4,517,099 | 5/1985 | Breckner | 210/665 |

Primary Examiner—Carlton R. Croyle
Assistant Examiner—Ted Olds
Attorney, Agent, or Firm—C. A. Rowley

[57] ABSTRACT

A pump for pumping a slurry of frail material is provided by a rigid chamber which is connected to a source of negative air pressure when an inlet valve is open and an outlet valve closed to suck the slurry through the open inlet valve into the chamber, the amount of slurry in the chamber is sensed and when it reaches a preset amount a controller is triggered to disconnect the source of negative pressure and close the inlet valve, and then admit air under positive pressure to the chamber, then open the outlet valve to drive the contents of the chamber through the outlet by replacing a significant amount of the contents with air. The controller then causes the air pressure in the chamber to be reduced and closes the outlet valve, and then reconnects the chamber to the source of negative pressure and then opens the inlet valve to commence a second cycle. The inlet and outlet valves are bladder type valves to protect the frail material and permit simplified operation.

20 Claims, 5 Drawing Sheets

FRAIL MATERIAL SLURRY PUMP

FIELD OF THE INVENTION

The present invention relates to a pump for pumping a slurry of frail material, more particularly the present invention relates simplified control system and an improved pump incorporating a suction and pressure cycle.

BACKGROUND TO THE PRESENT INVENTION

The concept of sucking frail material such as fish in a slurry through an inlet into a chamber and then forcing the fish from the chamber by applying air pressure to the chamber to drive the contents of the chamber out the outlet with the inlet valve closed is described for example in U.S. Pat. No. 3,871,332 issued Mar. 18, 1975 Hayashi.

In the system described in the Hayashi patent relatively elaborate controls are required and the operation is triggered by means of a float suspended within the chamber and responding to the level of liquid to activate a control mechanism when the level sensed by the float reaches a preset upper and a preset lower limit. The control mechanism opens and closes the various valves to apply either negative or positive air pressure to the chamber and open and close the inlet and outlet valves depending on the operating mode in which the pump is being operated.

The inlet and outlet valves used in this system are check valves which open and close depending on the pressure in the chamber. This arrangement was found to be unsatisfactory in practice as fish did not always clear the check valves and if the valve attempted to close with a fish caught therein the fish would either prevent closing of the valve rendering the pump inoperative or would be cut or damaged in some way to permit closing thereby reducing the value of the fish.

To overcome this problem of fish tampering with the operation of the check valves and damage being inflicted on the fish by the valves in closing an elaborate system of pumping water per se through each check valve before it was closed was installed. This water flushed the valves clean before they were closed and made the system operative but clumsy while requiring elaborate controls and reducing the reliability and capacity of the pump by reducing its availability for pumping.

U.S. Pat. No. 4,517,099 issued May 14, 1985 to Breckner provides a significant improvement by providing a specific location for a check valve in the inlet thereby because of the slope of the passages leading to and away from the check valve, the check valve automatically clears itself by gravity when the system is operated. This system is very effective but requires an installation wherein the attitude of the pump structure particularly the check valve is preset at least within certain limits since gravity functions to clear the valve. This also necessitated that the inlet to the chamber be located adjacent the upper end of the chamber so that the in feed conduit had to pass to the upper end of the chamber. Thus while this system is effective for many operations and requires a reasonably simple control system it is not completely suitable for a pump that is to be suspended for example from a boom via cables as is required for certain operations, nor is it as compact as one might desire for installation for example in the hold of a ship.

Bladder valves or as they are sometimes called, pinch valves have been in use for many years in various industries but never in connection with pumping frail material. Examples of such bladder valves are shown in U.S. Pat. No. 4,268,005 issued May 19, 1981 to Raftis et al or U.S. Pat. No. 4,135,550 issued Jan. 23, 1975 to Anderson.

U.S. Pat. No. 3,007,416 issued Nov. 7, 1961 to Childs discloses a type of pump that uses two bladder type valves positioned one on the inlet and the other on the outlet side of a flexible tubular element that is deformed to increase and decrease the size of the interior of the element so that the element functions to suck and reject fluid.

The term frail material as used in the present disclosure is intended to describe material that may be damaged by valves or its value reduced when caught in a valve and interfere with the valve as it is closing, in particular food products such as fish, vegetables, fruit and the like.

BRIEF DESCRIPTION OF THE PRESENT INVENTION

It is the main object of the present invention to provide a simplified pump for a slurry of frail material that incorporate valves that tend to be self clearing, positively acting and likely to cause less damage to the frail material and employing a control that will be triggered by sensing the amount of slurry in the pump.

Broadly, the present invention relates to a pump for pumping a slurry of frail material comprising a rigid closed chamber having an inlet means including an inlet opening opening into chamber and inlet conduit extending from said inlet opening and away from said chamber, an outlet means including an outlet opening opening into said chamber adjacent the bottom of said chamber when said chamber is in operative position and an outlet conduit communicating with said outlet opening and extending from said outlet opening away from said chamber, an inlet valve means controlling flow through said inlet means and an outlet valve means controlling flow through said outlet means, means to connect a source of positive or a source of negative air pressure to the interior of said chamber, control means controlling the application of said positive and negative pressures to said chamber and controlling the opening and closing of said inlet and outlet valve means and sensing means for sensing the amount of said slurry in said chamber at least when said chamber is filled to a preselected degree, said sensing means when said sensed amount reaches a preset maximum indicating said chamber is full to the required extent with said slurry triggering said control means to disconnect said chamber from said source of negative air pressure and close said inlet valve, and then connect said chamber to said source of positive air pressure and then open said outlet valve to drive a significant amount of said slurry from said chamber out through said outlet opening and then causing air pressure in said chamber to be reduced and closing said outlet valve means, then reconnecting said source of negative air pressure to said chamber and opening said inlet valve to repeat the cycle.

Preferably at least said outlet valve means will comprise a bladder valve and most preferably both said inlet and said outlet valve means will each comprise a bladder valve.

In a preferred arrangement of the present invention the sensing means is a weight sensing means and is incorporated in a cable system by which the chamber is suspended so that the total weight of the chamber and contents is determined by sensing the tension in said cable system.

In another system weight sensing means includes sensor means in the mounting of the chamber on a rigid support so that the force between the support and chamber is measured to provide an indication the weight of the chamber.

Yet another system incorporates means for measuring the pressure at the top and bottom of the chamber to determine the weight of slurry in the chamber.

In another preferred system the sensing means comprise a float valve in said chamber closing a passage through which air is withdrawn when said chamber is connected to said source of negative air pressure to cause the pressure in said passage to decrease and sensing said decreased pressure to trigger said controller means.

Other level sensors may also be used. A preferred level sensor is a hot point sensor that senses the change in temperature of a heated probe, the temperature of which changes depending on whether or not it is submerged in the slurry.

Preferably said inlet valve means will comprise a bladder valve having means for selectively connecting an operating chamber of said bladder valve to a source or negative pressure when said valve is in open position, preferably by connecting said operating chamber to said chamber via a valved conduit.

BRIEF DESCRIPTION OF THE DRAWINGS

Further feature, objects and advantages of the present invention will be evident from the following detailed description of the preferred embodiments of the present invention taken in conjunction with the accompanying drawings in which.

DETAILED DESCRIPTION OF THE PREFERRED EMBODIMENTS

Figure 1:
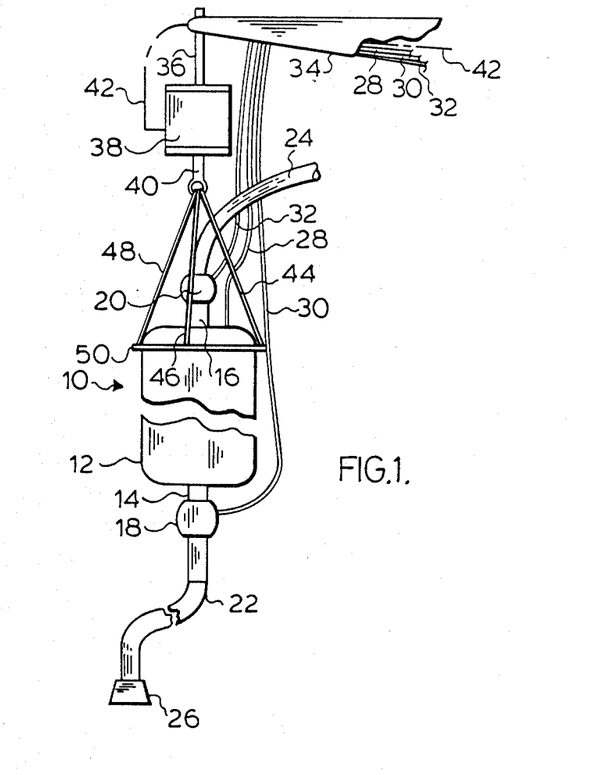
FIG. 1 is schematic side elevation view of fish pump system incorporating the present invention showing the weight sensing means in the cable support or suspension system for the pump.

As shown in FIG. 1 the pump 10 generally comprises a rigid chamber 12 having extending from one thereof an inlet conduit 14 opening directly into the chamber 12 and from the opposite end thereof an outlet conduit 16. Suitable inlet and outlet valves 18 and 20 are provided one in the inlet and outlet conduits respectively. Extending from the ends of the valves 18 and 20 remote from the chamber 12 are suitable flexible pipes or the like 22 and 24 respectively. The pipe 22 leads to an inlet shoe 26 and the outlet pipe 24 carries the slurry being pumped (eg. a slurry of fish) to the desired destination.

In the arrangement illustrated in FIG. 1 various fluid plumbing lines illustrated by the lines 28, 30 and 32 are connected respectively to the chamber 12 and the valves 18 and 20 to provide positive or negative pressure within the chamber 12 and to open and close the valves 18 and 20.

The pump 10 of FIG. 1 is suspended from a boom or the like 34 through or along which the various lines 28, 30 and 32 pass to connect with the fluid pumps (not shown) and control valves. The pump 10 is suspended from the boom 34 via a tension cable 36 having interposed intermediate its length a sensor 38 adapted to sense the tension between the upper section 36 of the cable and the lower section 40 which is on the opposite side of the sensor 38. Any suitable weight sensor 38 may be used. The signal generated by the sensor 38 is carried on the dot dash line 42 to the controller 70 as will be explained in detail hereinbelow.

Any suitable stabilizing suspension system may be used to suspend the pumping system from the lower cable 40. In the illustrated arrangement 3 tension cables 44, 46 and 48 are connected to an annular ring or flange 50 on the upper end of the chamber 12.

It will be apparent that the sensor 38 carries essentially the full weight of the unit and thus it will sense the weight thereof. The degree of submergence of the piping to and from the chamber and the extraneous support of this piping may contribute to or detract from the weight sensed by the sensor 38 and for this reason the set point that triggers the operation of the controller (to be described below) is adjustable easily to vary the setting as desired to accommodate any particular arrangement. It is not essential that the preset triggering weight be particularly accurate in absolute terms.

One simple way of setting the preselected weight is to use the sensor to sense the weight of the empty chamber and set the preset weight a selected amount higher than the weight empty.

Figure 2:
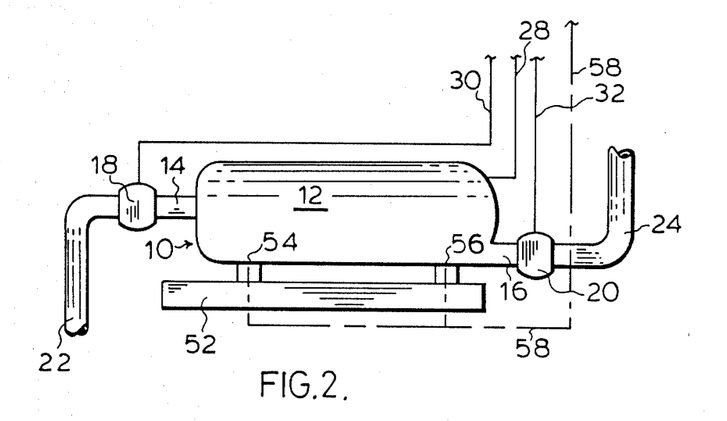
FIG. 2 is schematic illustration of the pump supported on a rigid platform illustrating weight sensing means interposed between the chamber and the rigid support.

In the arrangement shown in FIG. 2 the chamber 12 of pump 10 has its bottom substantially horizontal or sloped slightly downward toward the outlet and it is fixed to fixed platform 52 with suitable sensors 54 and 56 positioned in the mounting (only two sensor are shown). The signal representative of the weight of the chamber 12 is transmitted via line 58 (equivalent to line 42) to the controller as will be described hereinbelow.

Figure 3:
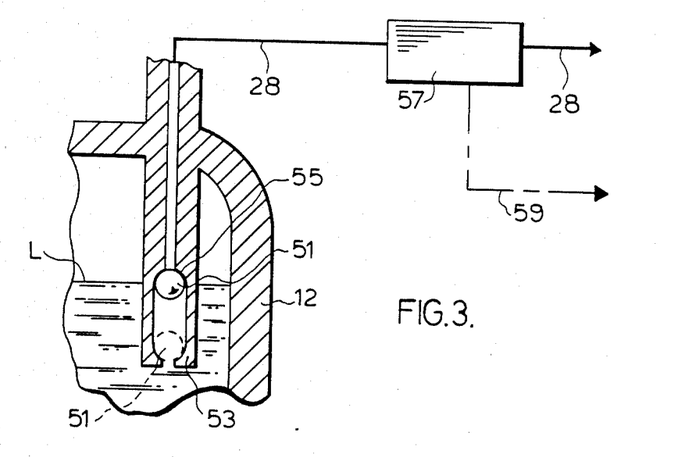
FIG. 3 is a schematic illustration of a float sensor for triggering the control.

An alternative triggering system for the controller 70 is illustrated in FIG. 3. In this system the weight sensor is eliminated and a simple float valve is used such as the ball 51 held within the cage 53 at the connection of piping 28 into the chamber 12 to seal off this connection when the chamber 12 is filled to the required extent. The ball 51 moves vertically in the cage 53 between the position illustrated by the dotted line at the bottom of the cage 53 and wherein the conduit 28 is connected to the chamber 12 and the position illustrated in a solid line wherein the ball 51 cooperates with the seat 55 to seal off the conduit 28 and prevent further withdrawal of air from the chamber 12.

When the ball 51 seats against the seat 55, which occurs when the level L of the slurry in the chamber 12 reaches a preset height, the flow of air from the chamber 12 ceases and the pressure in the line 28 decreases. The sensor 57 senses this decrease in pressure and transmits this information to the controller 70 via line 59 to trigger the operation of the controller 70.

Figure 4:
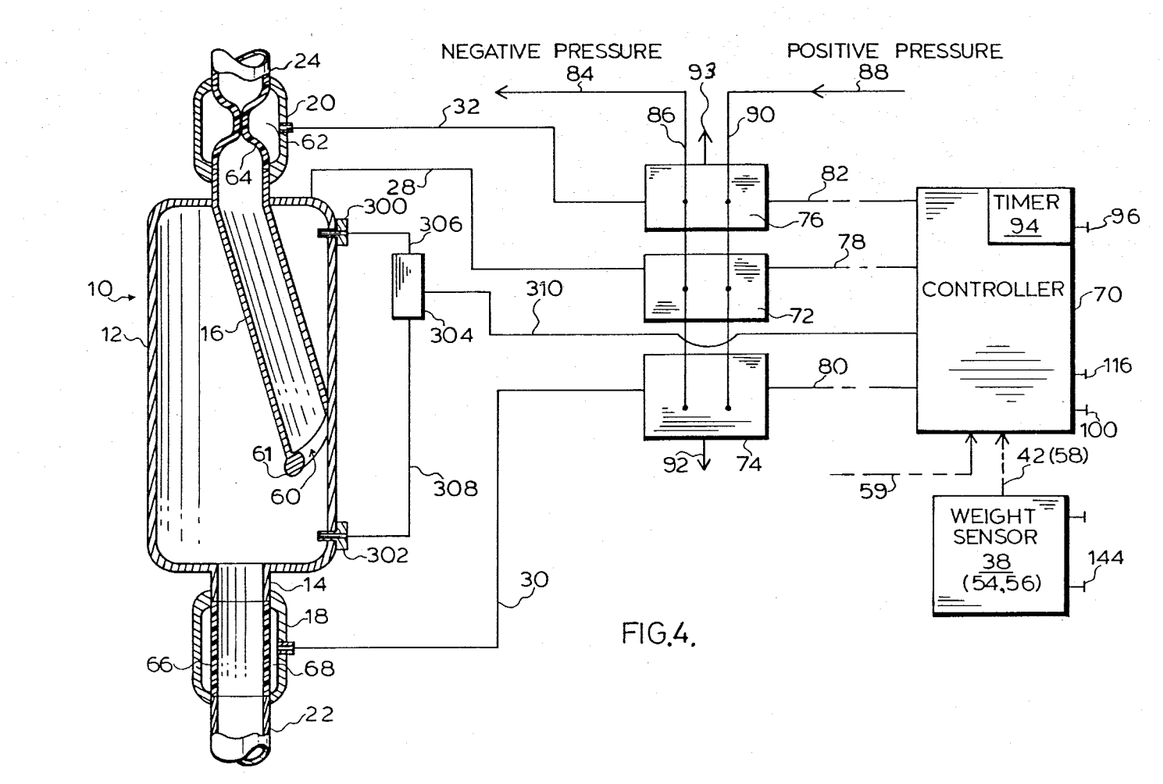
FIG. 4 is a schematic section of a pump constructed in accordance with the present invention showing the controller and valving system to operate the inlet and outlet valves and the application of positive or negative pressure to the interior of the chamber.

Referring to FIG. 4 the pump 10 has been shown in section illustrating the hollow chamber 12 with the outlet conduit 16 projecting downwardly therein and terminating in an open end 60 located adjacent the lower or bottom end of chamber 12 which is adjacent the inlet conduit 14.

Preferably a rounded bead or the like 61 will be provided at the mouth 60 of the outlet pipe 16 to facilitate movement of the frail material from the inside of the chamber 12 through the mouth 60 and into the conduit 16.

In the arrangement shown in FIG. 4 pressure has been applied to the chamber 62 of the bladder valve 20 to force the valve 20 into a closed position wherein the bladder 64 which is some form of collapsible flexible tubular member is collapsed into the closed position as illustrated. There are many different bladder structures available and the present invention may incorporate any suitable such bladder structure. The valve 18 is shown in open position and the chamber 68 of this valve may be under negative or neutral pressure, depending on the structure of the bladder 66 to hold the bladder in open condition as a tubular member. For many bladders the open position as illustrated for valve 18 is the stable or neutral position requiring no negative pressure with positive pressure only being necessary to collapse the bladder to closed position. Both the valves 18 and 20 may have the same structure. Because these are relatively large valves necessary to handle the flows of slurry of frail materials it is preferred to apply negative pressure to the operating chamber 68 of the valve 18 when the valve is in its open position to counteract the negative pressure applied from the chamber 12 and tending to close the valve 18 when the chamber 12 is under negative pressure conditions. The valve 20 is not open when the chamber 12 is under negative pressure conditions and will only be open (when the pump is operating) when the chamber 12 is under a positive air pressure and therefor is not subject to being sucked to closed position by negative pressure in the chamber 12.

The sensor 38 or 54 and 56 or 57 is used to trigger the controller 70 which controls the control valves 72, 74 and 76 in the lines 28, 30 and 32 respectively as indicated by the dot dash lines 78, 80 and 82 respectively. These valves connect their respective lines 28, 30 and 32 to the a source of suction i.e. negative pressure as indicated by the arrow 84 via line 86 and the source of air under positive pressure as indicated by the arrow 88 via line 90 or depending on the bladder structures of the valves 18 and 20, the valves 74 and 76 may be connected to the vents 92 or 93 instead of line 84 as will be described below.

The system illustrated in FIG. 4 operates as follows. On start-up of the pump 10 the outlet valve 20 is closed or moved to closed position i.e. in the position as illustrated in FIG. 4 and thus the valve 76 is operative to connect the positive pressure in line 90 to the line 32 and thus move the bladder 64 in valve 20 to the closed position shown. At the same time the valve 74 depending on the type of bladder 66 in valve 18 connects line 30 either to the negative pressure in line 86 or to the vent 92 i.e. if negative pressure in the chamber 68 of valve 18 is not necessary to maintain the valve 18 in open position then line 30 need only be vented as will normally be the case. In the latter case the line 86 need not be connected to the valve 74 and only the vent 92 need be provided.

The valve 72 then connects the line 28 to the negative pressure line 86 thereby withdrawing air from the inside of the chamber 12 which draws the slurry of frail material eg. water and fish up through the pipe 22, valve 18 and inlet conduit 14 into the inside of the chamber 12 to fill the chamber 12 with a slurry of fish and water. The sensor 38 (54,56) or 57 senses when the amount of slurry in the chamber 12 reaches the desired level. When a preset amount is sensed by the sensor 38 or (54,56) or 57, at which time the chamber is deemed to be full, the controller 70 is triggered. The controller 70 then activates the valve 72 to disconnect the line 28 from the line 86 and the source of negative pressure 84 and thereby disconnect the chamber 12 from the source of negative pressure. Obviously if the ball valve controller of FIG. 3 is used the chamber 12 is disconnected from the source of air under negative pressure when the ball 51 is seated in the seat 55. The valve 74 is then actuated to connect the line 30 to the source of positive air pressure 88 via line 90 and thereby close the valve 18. It is important that the pressure in the chamber 12 not be permitted to rise significantly before the valve 18 is fully closed, thus the chamber 12 cannot be connected to the source of positive pressure 88 unless the valve 18 is closed. In any event when the connection is made between the lines 30 and 90 by the valve 74 the operating chamber 68 of valve 18 fills with fluid and collapses the bladder 66 to a closed position and thereby closes valve 18 substantially as illustrated for valve 20 in FIG. 4. This closes off the inlet so that no further movement of fish into the chamber 12 can occur.

The pressure exhaust portion of the pumping cycle then commences. The valve 72 now connects the inside of chamber 12 to the source of air under positive pressure 88 to raise the pressure in the chamber 12. The valve 76 is then actuated to either connect the line 32 to the source of negative pressure as indicated at 84 via line 86 or to connect the chamber 62 to vent 93 depending on the type of bladder used in the valve 20 as described hereinabove with respect to the valve 18. This opens the valve 20 and connects the outlet conduit 16 with the pipe 24. The fish slurry is thereby forced around the element 61 and into the inlet 60 of the outlet conduit 16 and out through the outlet and pipe 24.

The controller 70 controls the times between the operations of the various valves as required. The duration of the predetermined period of time when the pressure is introduced into the chamber 12 may be adjusted as indicated by knob 96 on a timer 94 which forms part of the controller 70 and thereby control the amount of slurry moved from the chamber 12 i.e. the cycle capacity of the pump and to insure that air does not pass into the outlet conduit 16 in the pressure portion of the cycle.

After a preset period of time valve 72 disconnects the chamber 12 from the source of positive air pressure 88 and may move into a neutral position where neither positive nor negative air pressure is applied to the chamber i.e. the line 28 is sealed. The valve 76 now again connects line 32 to the positive pressure line 90 thereby to inflate the bladder 64 of valve 20 back to the closed position as illustrated in FIG. 4, and then the valve 72 is then operated to connect the chamber to the source of air at negative pressure and reduce the pressure in the chamber 12. The chamber 12 should remain at positive pressure until the valve 20 closes to prevent the slurry from flowing back toward the chamber 12 through the valve 20, yet the pressure should be reduced somewhat so that flow through the valve 20 will at least be slowed to an appropriate rate before the valve 20 is moved to closed position otherwise damage to the solids in the slurry or even to the valve might occur if the valve 20 were moved to the closed position with the slurry flowing therethrough at too fast a rate.

After the valve 20 is closed the valve 72 then connects the chamber 12 to the source of negative air pressure 84 and the valve 74 is then actuated to connect the line 30 to the vent 92 or the line 86 depending as above described on the type of bladder to move the bladder 66 to the position shown in FIG. 4 i.e. to open the valve 18 and repeat the pumping cycle.

As above indicated when a weight sensor is used the triggering weight indicating that the chamber 12 is full may can be adjusted. This adjustment may be made by the controller 70 as indicated by the knob 100.

Figure 5:
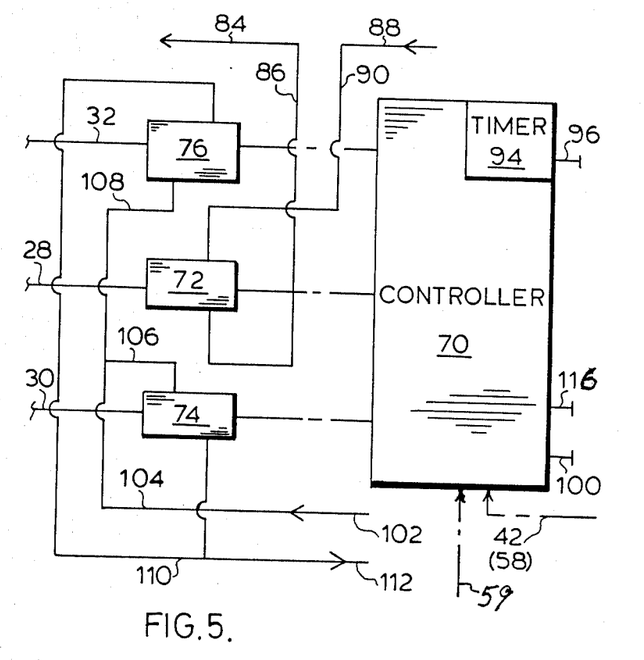
FIG. 5 is a view of a modified control system wherein an incompressible fluid operates the inlet and outlet valves.

The arrangement above described with respect to FIG. 4 is essentially the same as the that illustrated in FIG. 5 with the exception that in FIG. 5 two different fluids are used, one an incompressible fluid to operate the valves 18 and 20 and supply the lines 30 and 32 and the other the negative and positive air pressure which in this case are only connected via valve 72 to line 28. The triggering and timing of the valves 72,74 and 76 is the same in both embodiments.

As illustrated in FIG. 5 the valves 74 and 76 use an incompressible fluid such as water to move the valve bladders 64 and 66 to closed position. Generally water under pressure will be available from a source as indicated by the arrow 102 in line 104 which is connected to the valve 74 via line 106 and to valve 76 via line 108. If the valves 18 and 20 when not subjected to pressure in their respective chambers will automatically return to the open position it is only necessary to provide a vent as indicated by line 110 and arrow 112. If desired a pump may be provided for line 110 to cause the flow as indicated by the arrow 112 and apply a negative pressure tending to hold the valves in open position.

The arrangement of FIG. 5 operates in the same manner as the FIG. 4 arrangement with the exception that instead of air pressure used to close the valves 18 and 20 hydraulic presure is used.

Figure 6:
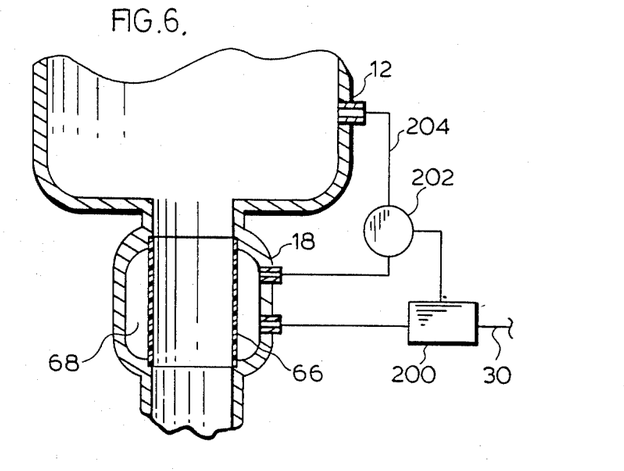
FIG. 6 is a schematic illustration of a system for selectively applying reduced pressure to the operating chamber of the inlet bladder valve.

It may be necessary to apply reduced pressure to the operating chamber 68 of the valve 18 when the valve 18 is in open position to hold the valve 18 open. If the valve is connected to the source of negative pressure as in line 84 of FIG. 4 no other means is necessary, but where the valve chamber 66 is connected to a vent such negative pressure obtained by connecting the interior of the operating chamber 68 to the interior of the chamber 12 when the valve 18 is in open position. A suitable means for doing this is illustrated in FIG. 6. Such a system is not required for the outlet valve 20 which is subjected to positive pressure in outlet 16 holding the valve open.

As shown in FIG. 6 a sensor 200 is provided in the line 30 to sense the pressure therein. When the pressure in line 30 is above a preselected minimum the sensor 200 actuates the valve 202 to close off the flow through the line 204 connecting the operating chamber 68 of valve 18 with the chamber 12, however when the pressure in the line 30 is below the preset level the valve 202 is open and the pressure in chamber 68 is suitably balanced with the pressure in the chamber 12 so that the negative pressure in chamber 12 does not tend to close the valve 18.

Figure 7:
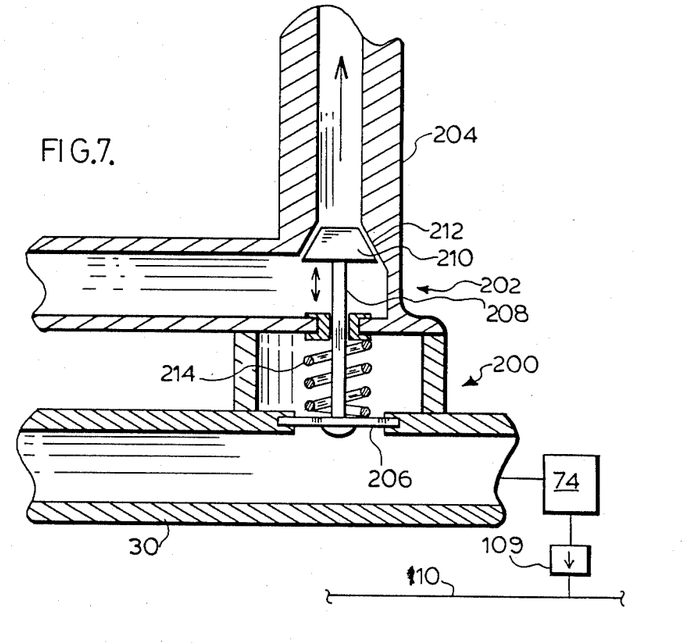
FIG. 7 illustrates an automatic valve system for applying reduced pressure to the bladder of the inlet valve.

In the system illustrated in FIG. 7 the sensor 200 is in the form of a resilient diaphragm 206 to which the valve stem 208 of the valve 200 is rigidly connected. In the FIG. 7 embodiment the valve 202 is provided at the end of stem 208 with a tapered plug 210 adapted to co-operate with the seat 212 to close conduit 204 when the valve is in closed position. The stem 208 and thus the diaphragm 206 and plug 210 are biased to the open position by a spring 214 coiled about the stem and bearing against the outside of diaphragm 206. The inside of diaphragm 206 is exposed to the fluid in the conduit 30 and is deflected against the bias of the spring by the pressure of the fluid in the line 30 to move the plug 210 onto seat 212 when the pressure in line 30 closes valve 18. Obviously the chamber 12 must not be connected to atmosphere through the valve chamber 68 and thus the chamber 68 must be sealed. A simple way of sealing the chamber 68 is to provide a check valve 109 in the line from valve 74 to line 110 to permit exhaust of fluid from valve 74 into the line 110 but prevent flow in the opposite direction.

Figure 8:
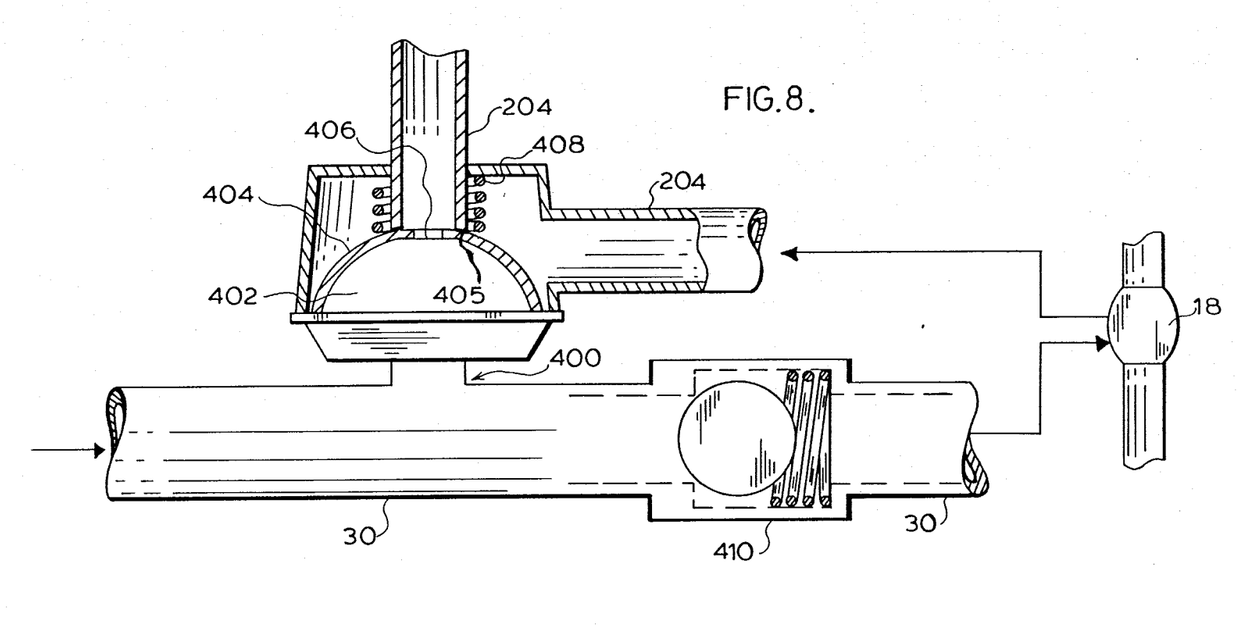
FIG. 8 is a schematic illustration of an alternative arrangement for balancing pressure on opposite sides of a bladder or permitting opening of a bladder valve.

The FIG. 8 version permits the vent for valve 74 (or 76) to be eliminated. In this arrangement a T-connection 400 is provided in the line 30. The branch of the T-connection 400 opens into a diaphragm chamber 402 on one side of a expandable diaphragm 404 positioned to co-operate with a seat 405 and seal the pipe 204 between the chamber 12 and the bladder valve 18 when the diaphragm 404 is expanded. A bleed hole 406 leads through the diaphragm 404 to permit flow of fluid from one side to the other of the diaphragm 404 eg. from the side of chamber 402 connected directly to the line 30 via T-connection 400 into the pipe 204 or vice versa. A spring 408 biases the diaphragm 404 from the sealed position shown in FIG. 8 into an open position permitting flow through pipe 204 between the chamber 12 and the valve 18 when the line 30 is disconnected from the source of fluid under positive pressure and when the chamber 12 is under negative pressure.

A suitable check valve 410 is provided in the line 30 between the T-connection 400 and the bladder valve 18. The check valve 410 permits flow through the line 30 to the bladder valve 18 and seals to prevent flow in the opposite direction.

In operation of the system illustrated in FIG. 8 when the valve 18 is to be closed, pressure is applied in line 30 which forces the diaphragm 404 to seal on seat 405 and prevent flow through the line 204 to or from the chamber 12 except for the minor amount through the bleed 406. When the valve 18 is to be opened the valve 74 disconnects the line 30 from the source of fluid under pressure (valve 74 need only be a simple on off valve i.e. the vent 92 or 110 are not needed).

When the line 30 is disconnected from the source of fluid under pressure the pressure in line 30 adjacent the T-connection 400 is reduced by fluid being bled through the bleed 406, this reduces the pressure forcing the diaphragm 404 to sealing position against the seal 405 and permits the spring 408 to move the diaphragm 404, open the pipe 204 and permit fluid to flow from the valve 18 through pipe 204 toward the chamber 12 thereby permitting the valve 18 to be opened. When suction or negative pressure is applied to the chamber 12 it is transmitted to the valve 18 and reduces the pressure in the bladder chamber 68 thereby tending to hold the valve 18 open by a better balance of the pressures on opposite sides of the bladder 66.

The system illustrated in FIG. 8 could also be used in the line 32 to the valve 20 which could simplify valve 76 by permitting elimination of the venting position. If this system is used in line 32 to outlet valve 20 the pipe equivalent to pipe 204 would not be connected to the chamber 12 but would connect to atmospheric pressure.

In the above description a timer 94 is used to initiate shifting of the vlave 72 to the position disconnecting the chamber 12 from the high pressure line 90 and closing the valve 20 thereby terminating the pumping of the fish through the outlet conduit 16 when the chamber has been properly exhausted of fish yet before exhaustion of air from the chamber 12 into the outlet conduit 16. The weight sensor 38 (54,56) may also be used for this purpose in place of the timer 94 by simply having a lower threshold i.e. one determining a minimum weight (a predetermined amount above the empty weight of the chamber 12 etc. to insure that the level of fish slurry in the chamber 12 does not expose the inlet 60 to air). In this case both the upper weight threshold and lower weight threshold will require adjustment on set up and therefore a second adjustment as indicated by the knob 144 to 116 may be provide either on the weight sensor 38 (54,56) or controller 70 respectively. In operation sensing the lower threshold will trigger causing the reduction of pressure in the chamber 12 eg. by the disconnecting of the chamber 12 from the positive pressure source 88 and the closing of the valve 20, with the timing of the other operations being essentially the same.

Referring back to FIG. 4 yet another type of sensor is illustrated. In this arrangement a pressure sensor 300 is provided to sense the pressure at the top of the vessel or chamber 12 and a second pressure 302 sense the pressure at the bottom of the chamber 12. The sensors 300 and 302 are connected to a unit 304 via line 306 and 308 respectively. The unit 304 determines the difference in the pressures at the top and bottom of the chamber 12 as sensed by the sensors 300 and 302 respectively and provide an indication of the weight of slurry in the chamber 12. The unit 304 is connected to the controller 70 via the line 310 to transmit this information to the controller 70. When the amount of slurry in the chamber 12 reaches a predetermined amount the controller 70 is actuated to commence the pressure or exhaust portion of the pumping cycle i.e. the negative pressure source is disconnected from the chamber 12, the valve 20 closed etc. Termination of the pressure portion of the pumping cycle may be initiated by the timer 94 or by the unit 304 sensing a lower weight threshold.

In the preceding paragraph the sensor 300 and 302 were described as pressure sensors, but as one alternative, they could be any suitable type of level sensors sensing the level of slurry in the chamber 12. For example the sensors 300 and 302 could be hot point sensors that measure the temperature of a heated probe. The temperature of the probe changes significantly depending on whether the probe is above or below the slurry level. This a change in probe temperature indicates that the level of slurry has past the location of the probe.

When the sensor 300 is a level sensor only the top sensor 300 is necessary if the timer 94 is used to time the output of the pump (pressure portion of the pumping cycle).

Having described the invention modifications will be evident to those skilled in the art without departing from the spirit of the invention as defined in the appended claims.

I claim:

1. A pump for pumping a slurry of frail material comprising a rigid closed chamber having an inlet means including an inlet opening opening into chamber and inlet conduit extending from said inlet opening and away from said chamber, an outlet means including an outlet opening opening into said chamber adjacent the bottom of said chamber when said chamber is in operative position and an outlet conduit communicating with said outlet opening and extending from said outlet opening away from said chamber, an inlet valve means controlling flow through said inlet means and an outlet valve means controlling flow through said outlet means, a source of positive air pressure, a source of negative air pressure, means to connect said source of positive or said source of negative air pressure to the interior of said chamber, control means ciontrolling the connection of said positive and negative sources of air pressure to said chamber and controlling the opening and closing of said inlet and outlet valve means and sensing means for sensing the amount of said slurry in said chamber at least when said chamber is filled to a preselected degree, said sensing means when the sensed amount of said slurry reaches a preset maximum indicating said chamber is full to the required extent causing said chamber to be disconnected from said source of negative air pressure and triggering said control means to close said inlet valve means, then to connect said chamber to said source of positive air pressure and to open said outlet valve means, said source of positive air pressure increasing the air pressure within said chamber to provide a positive air pressure directly on said slurry in said chamber thereby to drive a desired amount of said slurry being pumped from said chamber out through said open outlet valve means and said control means then causing the positive air pressure in said chamber to be reduced, closing and outlet valve means and then reconnecting said source of negative air pressure to said chamber and then opening and inlet valve means, said source of negative air pressure reducing the air pressure within said chamber thereby to draw more of said slurry into said chamber and repeating the cycle.

2. A pump as defined in claim 1 wherein said positive air pressure is caused to be reduced by disconnecting said source of positive air pressure from said chamber.

3. A pump as defined in claim 2 wherein at least said outlet valve means comprises a bladder valve operated to closed position by fluid under pressure and wherein said opening and closing said outlet valve means comprises connecting and disconnecting an operating chamber of said bladder valve to and from a source of said fluid under pressure.

4. A pump as defined in claim 3 wherein both said inlet and said outlet valve means each comprises a bladder valve each operated to closed position by fluid under pressure and wherein said opening and closing said inlet and outlet valve means comprise selectively connecting and disconnecting an operating chamber in each of said inlet and outlet bladder valves to and from a source of said fluid under pressure.

5. A pump as defined in claim 4 wherein said sensing means comprises a weight sensing means for determining the weight of said slurry in said chamber.

6. A pump as defined in claim 4 wherein said chamber is suspended from a cable system an wherein said sensing means comprises a weight sensing means that is incorporated in said cable system to that the total weight of said chamber and its contents is determined by sensing the tension in said cable system.

7. A pump as defined in claim 4 wherein said inlet conduit extends axially of said chamber from one end of said chamber and said outlet conduit extends axially of said chamber from the opposite end of said chamber.

8. A pump as defined in claim 7 wherein said chamber is suspended by a cable system.

9. A pump as defined in claim 4 wherein said control means includes a timer means adapted to be set to define the time interval said outlet valve means is open.

10. A pump as defined in claim 4 wherein said sensing means comprises weight sensing means which includes means to sense a lower weight limit and to activate said control means to disconnect said chamber from said source of positive air pressure when said lower weight limit is sensed.

11. A pump as defined in claim 4 wherein said inlet bladder valve has an operating chamber into which fluid under pressure is directed to close said inlet valve and wherein said operating chamber is connected to said chamber when said inlet valve means is open.

12. A pump as defined in claim 4 wherein said sensor means comprises a means for closing off flow from said chamber to said source of negative air pressure when said chamber is filled to a preset level with said slurry and means for sensing a drop in pressure between said source of negative air pressure and said chamber and to trigger said controller when said drop in pressure is sensed.

13. A pump as defined in claim 5 wherein said control means includes a timer means adapted to be set to define the time interval when said outlet valve is open.

14. A pump as defined in claim 3 wherein said sensing means comprises weight sensing means which includes means to sense a lower weight limit and to activate said control means to disconnect said chamber from said source of positive air pressure when said lower weight limit is sensed.

15. A pump as defined in claim 4 wherein said inlet bladder valve has an operating chamber into which fluid under pressure is directed to close said inlet valve means and wherein connecting means are provided for connecting said operating chamber to said chamber when said inlet valve means is open to transmit pressure between said chamber and said operating chamber.

16. A pump as defined in claim 5 wherein said sensor means comprises a means for sensing the pressure at the top end of said chamber and means for sensing the pressure at the bottom end of said chamber to provide an indication of the weight of said slurry in said chamber based on the difference in pressure sensed at the top and bottom of said chamber.

17. A pump as defined in claim 15 wherein said connecting means comprises a connecting conduit connecting said chamber to said operating chamber, a valve in said connecting conduit and means for opening said valve only when said inlet valve means is in open position.

18. A pump as defined in claim 17 wherein said means for opening includes a diaphragm exposed on one side to fluid pressure used to close said inlet valve means, means connecting said diaphragm to said valve to force said valve to closed position when said diaphragm is deformed by said fluid pressure and means biasing said valve to open position.

19. A pump as defined in claim 16 wherein said inlet bladder valve has an operating chamber into which fluid under pressure is directed to close said inlet valve means and wherein connecting means are provided for connecting said operating chamber to said chamber when said inlet valve means is open to transmit pressure between said chamber and said operating chamber.

20. A pump as defined in claim 4 wherein said inlet bladder valve has an operting chamber into which fluid under pressure is directed to close said inlet valve means and wherein connecting means are provided for connecting said operating chamber to said chamber when said inlet valve means is open to transmit pressure between said chamber and said operating chamber.

* * * * *

UNITED STATES PATENT AND TRADEMARK OFFICE
CERTIFICATE OF CORRECTION

PATENT NO. : 4,770,610

DATED : September 13, 1988

INVENTOR(S) : Raymond A. Breckner

It is certified that error appears in the above-identified patent and that said Letters Patent is hereby corrected as shown below:

Claim 1
 Column 10 line 25 "ciontrolling" to -controlling-
           45 "and" to -said-
           47 "and" to -said- Claim 6
 Column 11 line 5 "an" to -and- Claim 29
 Column 12 line 38 "operting" to -operating- Signed and Sealed this Fourth Day of April, 1989

*Attest:*

DONALD J. QUIGG

*Attesting Officer*   *Commissioner of Patents and Trademarks*